Jan. 13, 1970  P. E. EBERLY, JR  3,489,808
PROCESS FOR SEPARATING ALCOHOLS FROM HYDROCARBONS
Filed April 17, 1967  3 Sheets-Sheet 2

P. E. Eberly, Jr.  INVENTOR

BY *Michael Connery*

PATENT ATTORNEY

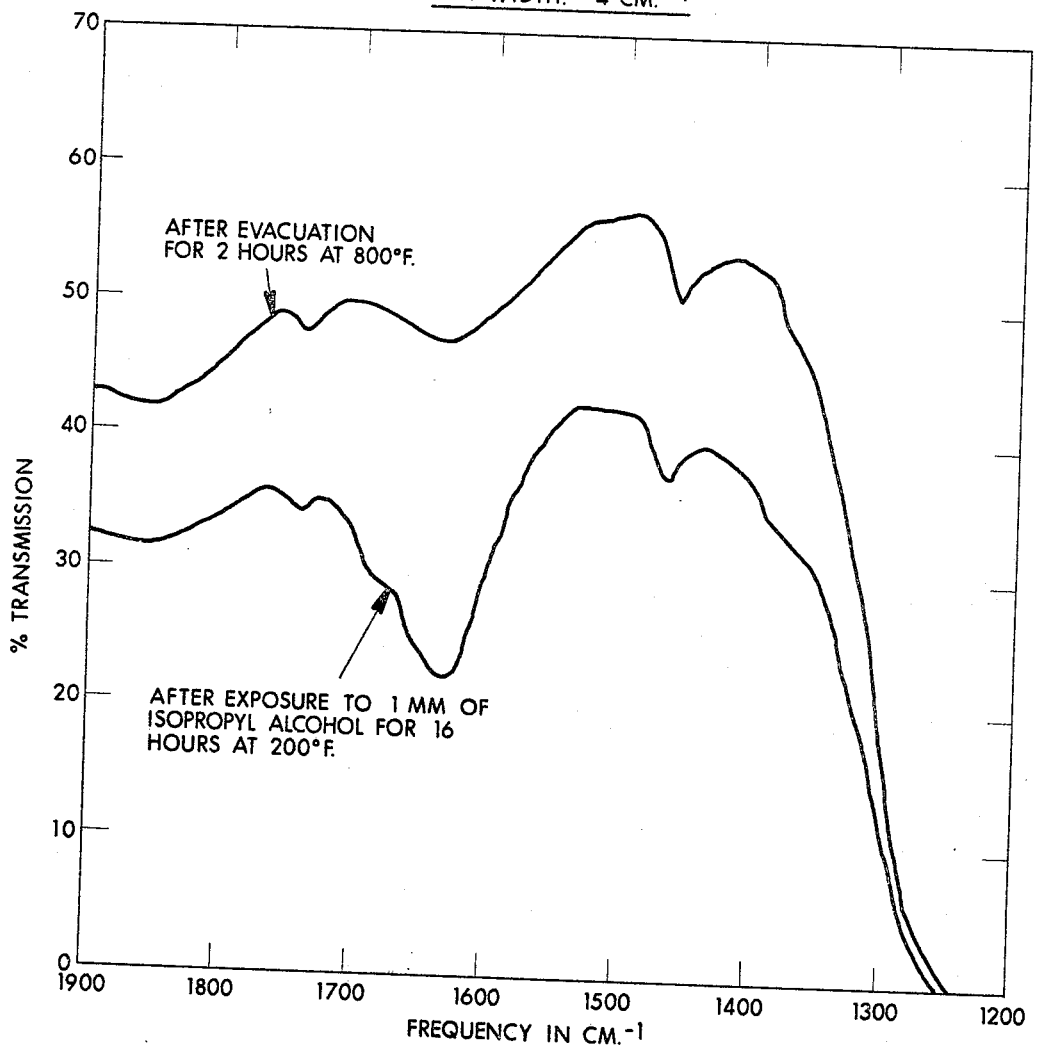

United States Patent Office 3,489,808
Patented Jan. 13, 1970

3,489,808
PROCESS FOR SEPARATING ALCOHOLS
FROM HYDROCARBONS
Paul Earl Eberly, Jr., Baton Rouge, La., assignor to Esso Research and Engineering Company, a corporation of Delaware
Filed Apr. 17, 1967, Ser. No. 631,540
Int. Cl. C07c 7/12, 27/26
U.S. Cl. 260—674
10 Claims

ABSTRACT OF THE DISCLOSURE

This invention relates to the separation of alcohols from hydrocarbons. This separation is accomplished by contacting the alcohol-hydrocarbon mixture with an acidic, high surface area solid which preferentially adsorbs the alcohol because of its higher polarity. In this process, the alcohol is also dehydrated on the surface forming an olefin and water. The recovered olefin may optionally be recycled back to the system from which the alcohol was removed. More particularly, the invention relates to the separation of alcohols from hydrocarbons on a hydrogen-zeolite and in particiular a hydrogen-zeolite "D," or a hydrogen-chabazite. This is particularly applicable in the case of isopropyl alcohol recovered from an ethylene-proylene polymerization unit. The propylene recovered following the dehydration of the isopropyl alcohol may be recycled to the unit for further processing.

DESCRIPTION OF THE PRIOR ART

The prior art relating to molecular sieves is quite extensive in nature. The sieves, or zeolites, have crystal structures containing large numbers of small cavities interconnected by a number of still smaller holes or pores, the latter being of exceptionally uniform size. Only molecules small enough to enter the pores can be adsorbed, though all molecules even though small enough to enter the pores will not be adsorbed. An affinity of the molecule for the adsorbents must be present. In order to separate normal paraffins from mixtures including at least one compound from the group consisting of cyclic, aromatic or isocompounds, a molecular sieve having an effective pore diameter of 3 to 6 A. units is required. Molecular sieves which have larger pore openings such as from 8 to 15 A. units may be utilized to separate aromatic compounds from hydrocarbon mixtures in which they are contained.

The scientific and patent literature contain numerous references to the adsorbing action of natural and synthetic zeolites. Among the natural zeolites having this sieve property, the ability to separate normal paraffins from admixtures, are chabazites, analcites and erionite. Currently, the most widely used zeolites are the type A adsorbent which is described in U.S. Patent 2,882,243 and the type X adsorbent which is described generally in U.S. Patent 2,882,244. More closely related to the instant invention is a teaching in Mellor, "Comprehensive Treatise on Inorganic and Theoretical Chemistry," volume 6, Green and Company, New York, 1925. This teaching defines the nature of zeolite "D." In U.S. Patents Nos. 3,024,867 and 3,024,868, assigned to Union Carbide, the ability of zeolite "D" for use in the separation of water and hydrogen sulfide from gas streams containing hydrocarbons is described at length. The separation, according to these patents, is based upon a combination of molecular size and molecular polarity.

Hersh, in Molecular Sieves (Reinholt, New York, 1961) pages 78–79, indicates that a separation of isopropanol from normal paraffins is possible on the basis of size when one makes use of a type 4 A. and type 5 A. molecular sieve. Consistent with this is the disclosure in U.S. Patent No. 2,859,256 to the effect that a type 5 A. molecular sieve may be utilized to separate straight chain alcohols from their corresponding non-straight chain alcohols.

Although as indicated above there is extensive prior art in this area, no suggestions can be found relating to the process involving the separation of an alcohol from a hydrocarbon mixture on zeolite "D" or particularly hydrogen zeolite "D" or hydrogen chabazite followed by dehydration of the adsorbed alcohol to form the corresponding olefin. This is indeed a valuable process and may be used to great advantage in a number of polymerization type processes. For example, in the ethylenepropylene copolymerization process, alcohol is needed to remove the metal containing catalyst from the rubbery cement product. However, in recycling some of the recovered products to the reactor, the alcohol must be completely removed since even trace amounts can have a deleterious effect on the catalyst. To understand more completely the utility of the process in this invention, reference should be made to FIGURE 1.

SUMMARY

More specifically, the instant invention deals with the unexpected finding that zeolite "D" and in particular, hydrogen-zeolite "D" or the hydrogen-form of chabazite, either the natural mineral or the synthetic product may be utilized to separate alcohols from hydrocarbons and then dehydrate the separated alcohols. This invention would encompass the separation of a wide range of alcohols but the preferred form of the invention would require that non-normal alcohols have 4 carbons or less. Normal alcohols up to $C_6$ may be separated by hydrogen-zeolite "D" or hydrogen chabazite. Following the adsorption the alcohols are dehydrated with the production of water and an olefin. Alcohols which may be separated include ethanol, n-propanol, isopropanol, n-butanol, secondary-butanol, and higher molecular weight straight chain alcohols.

The aforementioned alcohols may be separated from mixtures containing at least one aromatic, cyclic, paraffinic or olefinic compound.

As discussed previously, some of the most valued separations would be those involving the separation of isopropyl alcohol from n-hexane or xylene streams. This process has immediate application in the polymerization field. Other useful separations would be those of an alcohol from a hydrocarbon having approximately the same boiling point. Such mixtures frequently form azeotropes or constant boiling mixtures. Thus, isopropyl alcohol could be separated from benzene or cyclohexane by adsorption on the hydrogen-zeolite "D." In this matter, the problem of separating alcohols out of a mixture with a hydrocarbon with a relatively similar boiling point or with which it forms an azeotropic mixture has been solved.

The other aspect of this invention involves the dehydration of the adsorbed alcohol to form an olefinic hydrocarbon. The importance of such a process has been previously emphasized. This dual function, separation and dehydration, is accomplished when one utilizes hydrogen zeolite "D" or hydrogen-chabazite for this purpose. Thus, in a particularly preferred embodiment, this invention may also be utilized to effect the dehydration of an alcohol and the subsequent recovery of the corresponding hydrocarbon.

BRIEF DESCRIPTION OF THE DRAWINGS

The attached

FIGURE 3 is a graph illustrating the infrared spectra of H-zeolite "D" before and after adsorption of isopropyl alcohol.

DETAILED DESCRIPTION OF THE DRAWINGS

Figure 1:
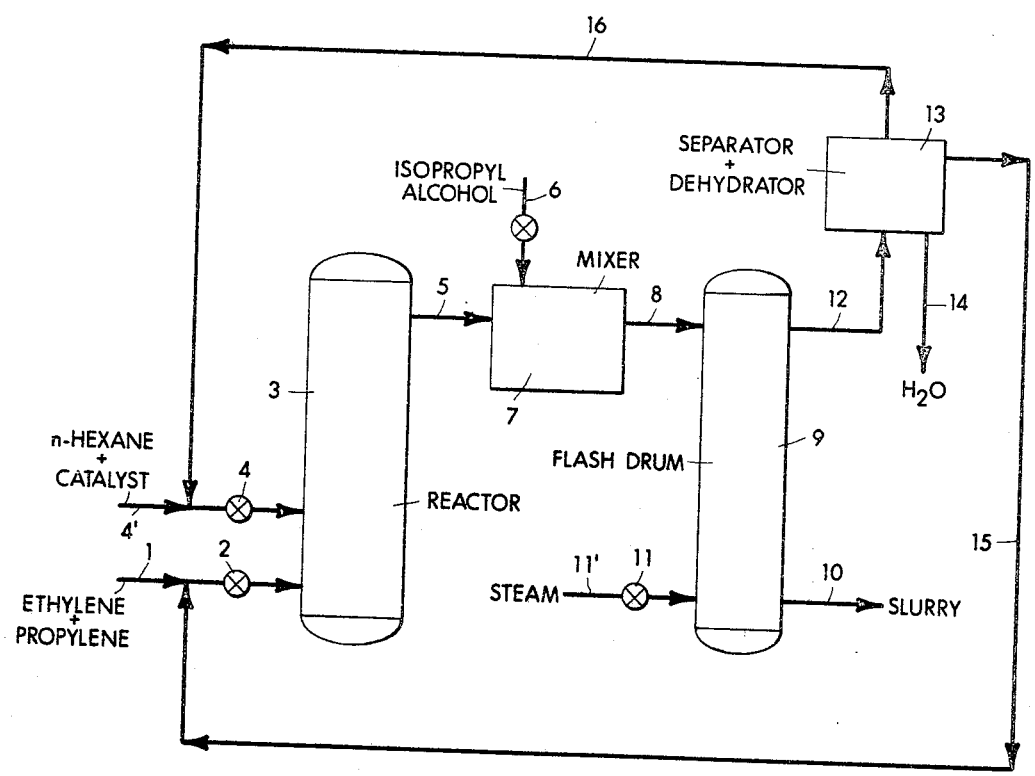
FIGURE 1 is a diagrammatic sketch illustrating the process of the instant invention.

In FIGURE 1 an ethylene-propylene stream is permitted to enter the reactor 3 through line 1 and valve 2. In the reactor, it is contacted with a stream of n-hexane solvent containing the $VOCl_3$ or $VCl_4$-alkyl aluminum halide metallic catalyst. This catalyst is introduced to the reactor through line 4' and valve 4. Upon completion of the reaction, the copolymer of ethylene and propylene which at this point is in the form of a cement flows through line 5 to mixer 7. Here, isopropyl alcohol introduced through line 6 is contacted with the cement in order to achieve a separation of the metal catalyst from the copolymer. This mixture is passed through line 8 to flash drum 9. Steam is introduced to the drum 9 through line 11' and valve 11 and volatilizes the n-hexane solvent plus a portion of the isopropyl alcohol plus any unreacted ethylene and/or propylene. This passes out of drum 9 through line 12. The aqueous slurry containing the copolymer comes out of the flash drum through line 10. The metallic catalyst which is water-soluble is contained in the aqueous phase of the slurry. The n-hexane stream in line 12 cannot be recycled directly to the reactor since any water or isopropanol deactivates the catalyst and causes a commensurate increase in catalyst consumption. It is the object of this invention to provide a means of separating the alcohol from the n-hexane stream and dehydrating the adsorbed alcohol to form adsorbed water and propylene. This is done in the separator and dehydrator 13. A specific and more detailed example of this process is described in FIGURE 2. The alcohol-free n-hexane stream is returned to the reactor 3 by passing through line 16 and valve 4. The recovered propylene passes through line 15 for recycle to the reactor. The impurity water exits through line 14.

Although this process is specifically described for the ethylene-propylene copolymerization, extensions to similar processes such as propylene polymerization may be easily visualized. In the latter, xylene rather than n-hexane is usually used as the solvent. In this case, alcohol is used extensively and it is important not only to completely remove it from the recycle stream but also to generate the propylene for recycle to the reactor.

Figure 2:
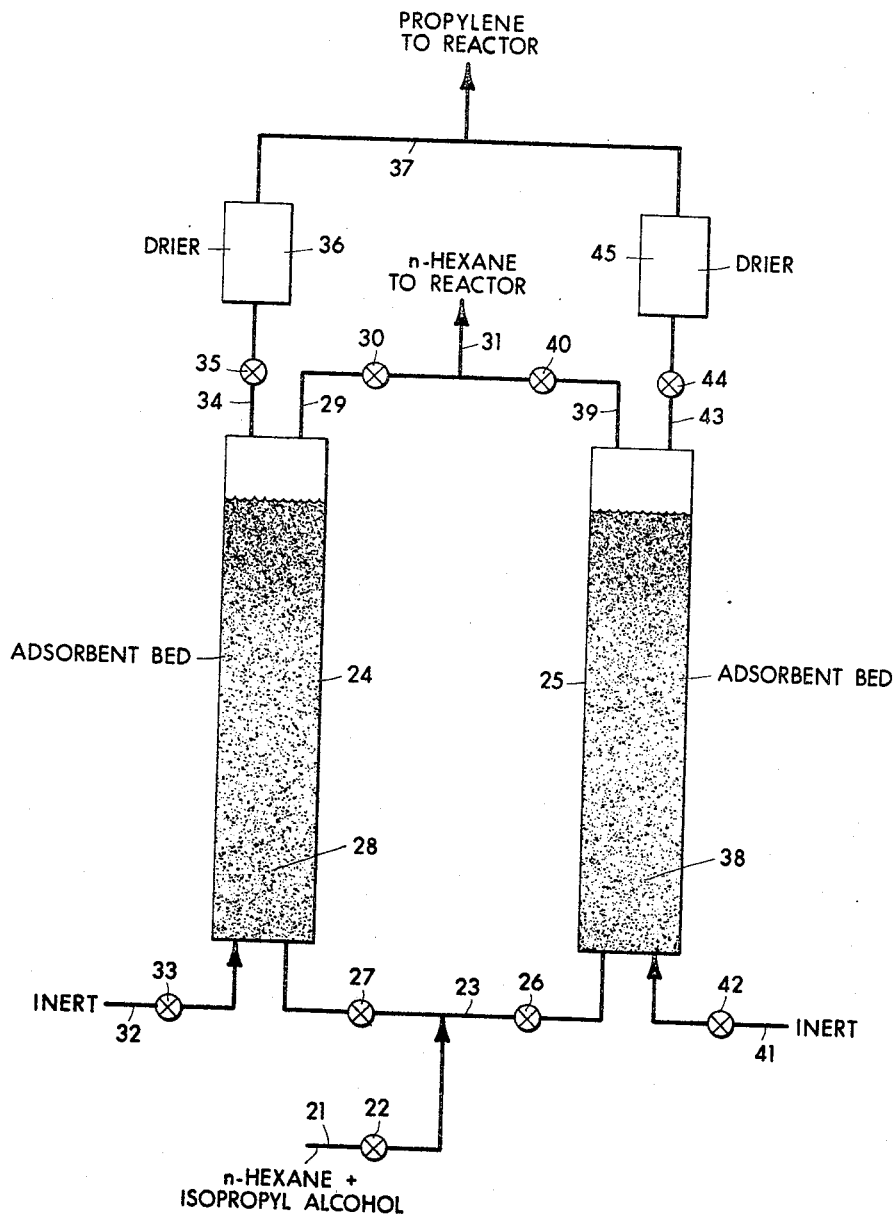
FIGURE 2 is a schematic representation of a particular embodiment of the instant invention. An explanation of the workings of the instant invention is given in terms of the separation of isopropyl alcohol from n-hexane. It is to be emphasized that the instant invention may be utilized to separate other alcohols such as ethanol, n-propanol, n-butanol, secondary-butanol, from their mixtures with hydrocarbons.

In FIGURE 2 a mixture of n-hexane and isopropyl alcohol is to be treated. It should be emphasized that the hydrocarbon to be separated from the alcohol may be paraffinic, olefinic, aromatic or cyclic in nature. The mixture is introduced through valve 22 and line 21 into line 23; line 23, in turn, leads either into adsorbent bed 24 or adsorbent bed 25. The positioning of valves 26 and 27 determines which bed it will enter. It should also be noted that a single bed operation may be utilized but in the instant case, two beds are used so that while one is being regenerated the other may be utilized for additional adsorption. The feed stream mixture is introduced into bed 24 in this case at a temperature of 70° to 200° F. The bed is maintained at a temperature of 70° to 500° F. and a pressure near atmospheric. The pressure is largely determined by the amount required to maintain the desired flow rate through the adsorbent bed. About 0.2 to 10 wt. percent of the isopropyl alcohol is adsorbed onto the adsorbent which is a hydrogen type D molecular sieve, or hydrogen chabazite designated as 28. Hexane is removed from the bed through line 29, passes through valve 30 and is recovered through line 31 from whence it may be passed to the reaction zone for the production of ethylene-propylene rubber as shown in FIGURE 1. After the bed is saturated with isopropyl alcohol, the flow of mixture stops and the bed is regenerated by sweeping off the adsorbed material which now consists predominantly of water and propylene. It should be emphasized again that the bed may be regenerated by any of several procedures. More particularly, a raise in temperature of about 100° to 400° F. accompanied by an inert gas purge or by means of a vacuum or a polar displacing agent such as $CO_2$, $SO_2$, ammonia or several lighter amines may be used for the desorption of the bed. These methods for desorption are well known in the art and consequently the desorption technique utilized is merely a matter of choice. In the instant case, an inert purge is utilized which may be nitrogen. The inert purge is passed through line 32 and valve 33 at a temperature of 75° to 200° F. for the necessary length of time at the given flow rate to remove nearly all the adsorbed material. A portion of the isopropyl alcohol has been dehydrated by this sieve and is now largely in the form of propylene and water. This stream issues from the bed through line 34 and valve 35 to a drier to remove the water. Any number of desiccants well known in the art may be used in the drier. However, certain molecular sieves such as 3 A. and 4 A. may be preferred since they will only adsorb the water. Propylene because of its larger size is excluded from the pores. The dry propylene is recovered through line 37 for recycle to the reactor as illustrated in FIGURE 1. During the regeneration of the bed, valve 27 is closed; valve 26 is opened and the feedstream is directed through line 23 into bed 25 which contains hydrogen type D zeolite or hydrogen chabazite designated as 38. Adsorbent bed 25 is maintained at the same conditions as previously described for adsorbent bed 24 during the adsorption cycle and the normal hexane is recovered through line 39 and valve 40 from when it passes into line 31 which in turn leads to the reaction zone for the production of ethylenepropylene copolymer. Upon saturation of the bed, the adsorbed material largely in the form of water and propylene is removed by a nitrogen purge through line 41 and valve 42. The propylene and water stream issues through line 43 and valve 44 to a drier. The dry propylene is recycled to the reactor through line 37.

As commonly prepared, zeolite "D" has the general formula of

$$0.9 \pm 0.2 [xNa_2O : (1-x)K_2O] \cdot Al_2O_3 \cdot wSiO_2 \cdot yH_2O$$

wherein $x$ is between 0 and 1 (preferably between 0.4 and 0.6), $w$ is between 4.5 and 5.5 and $y$ is approximately 7. The hydrogen-form is prepared from this material by any one of a number of techniques amply described in the art. In general, the sodium and potassium ions are removed from the structure by ion-exchange either with ammonium salts or by direct treatment with dilute acid. Treatment with ammonium salts is preferred since acid treatment sometimes results in a partial destruction of the crystal lattice. Thus, by an aqueous ion exchange with ammonium salts, the alkali ions are replaced with $NH_4^+$ ions. Upon heating the solid to elevated temperatures, $NH_3$ gas is liberated forming the hydrogen-zeolite "D."

The natural mineral, chabazite, has an X-ray diffraction pattern which is similar to zeolite "D" indicating that the materials have the same crystal structure. Thus, the mineral chabazite in its hydrogen-form would also be expected to adsorb and dehydrate alcohols in a manner completely analogous to zeolite "D."

Example 1

To prepare the hydrogen-form of zeolite "D," 4.0 grams of zeolite "D" was treated with a solution of 2.9 grams of NH₄Cl dissolved in 50 cc. of water. The slurry was stirred and heated for 2 hours at 150° F. It was then permitted to settle and the supernatant liquid was decanted. A fresh solution of NH₄Cl was then added and the treatment repeated. After decantation, the solid was again given a third ion-exchange treatment. The slurry was permitted to settle overnight and then, it was filtered. The filter cake was washed with distilled water until the filtrate was free of chloride ions. The cake was then preliminarily dried for 8 hours at 250° F. The sample was then calcined in moist air for 16 hours at 800° F. to convert the NH₄ into the hydrogen-form. Analyses of the starting material and final product are given below.

|  | Starting material | H-form |
|---|---|---|
| $SiO_2$, wt. percent | 61.6 | 72.7 |
| $Al_2O_3$, wt. percent | 20.9 | 24.7 |
| $Na_2O$, wt. percent | 7.9 | 0.5 |
| $K_2O$, wt. percent | 9.6 | 2.1 |
|  | 100.0 | 100.0 |

In this example, 1.385 gr. of hydrogen-zeolite "D" as prepared above was charged to a volumetric adsorption apparatus and thoroughly evacuated at 200° F. The amount of isopropyl alcohol adsorbed at various pressures was determined at 200° F. and data are given below.

Pressure, mm. Hg: Amount adsorbed, mmole/gram
1 _____ 0.271
5 _____ 0.509
21 _____ 0.632
40 _____ 0.685
63 _____ 0.711
86 _____ 0.738
108 _____ 0.776

These results show a high capacity of the hydrogen-zeolite "D" for isopropyl alcohol. The original starting material containing Na⁺ and K⁺ ions only had a capacity of 0.19 mmole/g. under the same conditions.

Example 2

To determine whether hydrogen-zeolite "D" could adsorb other alcohols, the adsorption isotherm of secondary-butyl alcohol was measured at 200° F. in a volumetric adsorption apparatus. Data are given below.

Pressure, mm. Hg: Amount adsorbed, mmole/gram
~0.1 _____ 0.207
9 _____ 0.299
20 _____ 0.366
35 _____ 0.382

Thus, hydrogen-zeolite "D" can also adsorb secondary-butyl alcohol.

Example 3

To understand the phenomena involved in the adsorption of alcohols on hydrogen-zeolite "D," a 1¼" diameter disk containing 100 mg. of sample was fabricated and inserted into a vacuum system of an infrared spectrometer and infrared spectra recorded during the adsorption of isopropyl alcohol at 200° F. Spectra are shown in FIGURE 3. The important band is that seen at 1630 cm.⁻¹ which is not found with pure isopropyl alcohol and is due to a hydrogen-bend vibration in a water molecule. As the sample is exposed to isopropyl alcohol, the intensity of this band increases with time indicating the formation of water molecules in the adsorbed phase by dehydration of the alcohol. The shoulder bands between 1630 and 1700 cm.⁻¹ are caused by —C=C— vibrations in the adsorbed propylene.

Example 4

In this example, about 1.2 grams of hydrogen-zeolite "D" was maintained in a glass chamber. A mixture of isopropyl alcohol and n-hexane was exposed to the zeolite for 16 hours at a temperature of 200° F. and a pressure of 192 mm. After the 16 hour exposure, the unadsorbed gas was trapped and analyzed; the results are as follows:

|  | Concentration in unadsorbed gas, wt. percent | |
|---|---|---|
|  | Before exposure to H-Zeolite "D" | After exposure to H-Zeolite "D" |
| Isopropyl alcohol | 17.34 | 0.57 |
| n-Hexane | 82.66 | 99.43 |

These results are indicative of the fact that the isopropyl alcohol is adsorbed to a very high degree on the zeolite.

Example 5

A sample of Nova Scotia chabazite was obtained and treated in a similar manner as described for zeolite "D" in Example 1 to prepare a hydrogen-form of chabazite. This mineral is believed to be structurally similar to zeolite "D." The adsorption isotherms of n-hexane and isopropyl alcohol were determined on this material at 400° F. Data are listed below and were obtained utilizing a gravimetric technique with a microbalance.

| n-Hexane | | Isopropyl alcohol | |
|---|---|---|---|
| Pressure, mm. | Amount adsorbed moles/gram | Pressure, mm. | Amount adsorbed moles/gram |
| 0.1 | 0.218 | 0.05 | 0.435 |
| 0.233 | 0.351 | 0.50 | 0.700 |
| 0.582 | 0.367 | 0.94 | 0.828 |
|  |  | 1.76 | 0.925 |

Thus, at any given pressure, hydrogen-chabazite adsorbs more isopropyl alcohol than n-hexane. Experiments at the same conditions in an infrared spectrometer showed that the adsorbed alcohol was dehydrated on the surface to form water molecules as characterized by a strong infrared band at 1630 cm.⁻¹. These results are analogous to those on hydrogen zeolite "D."

Although this invention has been described with some degree of particularity, it is intended to be limited only by the attached claims.

What is claimed is:

1. A process for the separation of an adsorbable alcohol from a hydrocarbon with which it is in admixture which comprises contacting said mixture with a molecular sieve selected from the group consisting of hydrogen-zeolite "D" and hydrogen chabazite for a sufficient period so that at least a portion of the alcohol is adsorbed to the substantial exclusion of the hydrocarbon and recovering a stream depleted in alcohol.

2. The process of claim 1 wherein the contacting takes place at a temperature of 75° to 500° F.

3. The process of claim 1 wherein said hydrocarbon is selected from the group consisting of olefins, aromatics, paraffins and mixtures thereof.

4. A process for the adsorption of a normal alcohol having a maximum of 6 carbon atoms from a hydrocarbon with which it is in admixture which comprises contacting said mixture with a molecular sieve selected from the group consisting of hydrogen-zeolite "D" and hydrogen chabazite wherein a substantial portion of said alcohol is adsorbed onto said sieve, recovering a stream enriched in hydrocarbon, allowing said alcohol to remain in contact with said sieve for a sufficient period so that at least a partial dehydration of said alcohol takes place whereby water and the corresponding olefins are formed and desorbing said molecular sieve.

5. The process of claim 4 wherein the said hydrocarbon is xylene.

6. The process of claim 4 wherein said desorption is effected by raising the temperature in conjunction with an inert purge.

7. A process for the adsorption of an alcohol having a maximum of 4 carbon atoms from a hydrocarbon with which it is in admixture which comprises contacting said mixture with a molecular sieve selected from the group consisting of hydrogen zeolite "D" and hydrogen chabazite wherein a substantial portion of said alcohol is adsorbed onto said sieve, recovering a stream enriched in hydrocarbon, allowing said alcohol to remain in contact with said sieve for a sufficient period so that at least a partial dehydration of said alcohol takes place whereby water and the corresponding olefin are formed and desorbing said molecular sieve.

8. The process of claim 7 wherein said alcohol is an isoalcohol.

9. The process of claim 7 wherein said alcohol is isopropyl alcohol and said hydrocarbon is hexane.

10. The process of claim 7 wherein said hydrocarbon is xylene.

References Cited

UNITED STATES PATENTS

| 2,826,581 | 3/1958 | Mahan et al. | 260—674 XR |
|-----------|--------|--------------|------------|
| 3,037,338 | 6/1962 | Thomas | 260—676 XR |
| 3,094,569 | 6/1963 | Thomas | 260—676 XR |
| 3,161,690 | 12/1964 | Eggertsen | 260—676 XR |

DELBERT E. GANTZ, Primary Examiner

C. R. DAVIS, Assistant Examiner

U.S. Cl. X.R.

208—307; 260—676, 677